United States Patent Office 3,065,267
Patented Nov. 20, 1962

3,065,267
N-(BORON-SUBSTITUTED)-DERIVATIVES OF CARBOXYLIC ACID AMIDES, THIO-CARBOXYLIC ACID AMIDES, AND UREAS
Konrad Lang and Friedrich Schubert, Leverkusen, Germany, assignors to Farbenfabriken Bayer Aktiengesellschaft, Leverkusen, Germany, a corporation of Germany
No Drawing. Filed May 17, 1960, Ser. No. 29,574
Claims priority, application Germany June 5, 1959
10 Claims. (Cl. 260—552)

The present invention relates to a new class of boron-nitrogen compounds; more particularly, this invention is concerned with condensation products of boron-nitrogen compounds and organic acid amides and a process of producing these condensation products.

Of the group of boron-nitrogen compounds which are substituted at the boron atom with hydrocarbon radicals, the amine trialkyl boranes and amine triaryl boranes are known; these known boron-nitrogen compounds are sensitive to air and therefore difficult to handle. The same holds true of aminoboranes carrying hydrocarbon radicals at the boron atom. Another group of known boron-nitrogen compounds comprises boric acid amides which are decomposed already when being subjected to atmospheric moisture.

It is an object of the invention to provide a class of new and useful boron-nitrogen compounds which are substantially stable to the action of air, oxygen and atmospheric moisture.

Another object of the invention is to provide a process of preparing the new compounds of the invention.

Further objects of the invention will become apparent from the following description.

The new compounds of the invention can be represented by the general formula

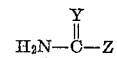

wherein $n$ is 0, 1 or 2, R stands for an alkyl-, cycloalkyl-, aryl- or alkyl-aryl radical, Y means oxygen, sulfur or a NH-group, Z means an alkyl-, aryl-, cycloakyl-, arylalkyl radical, an amino, alkylamino, arylamino, alkyl boroamido or aryl boroamido group.

Examples of compounds according to the invention correspond to the formulae

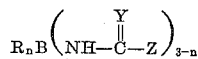

wherein R of the aforementioned general formula is propyl, Y is oxygen and Z is methyl;

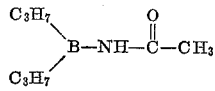

wherein R of the aforementioned general formula is propyl, Y is oxygen and Z is a phenylamino-radical;

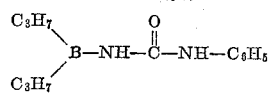

wherein R of the aforementioned general formula is propyl, Y is oxygen and Z is a phenylamino-radical;

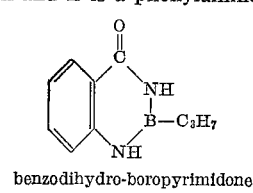

benzodihydro-boropyrimidone wherein R of the aforementioned general formula is propyl, Y is oxygen and Z is an anthranilamido-group.

The aforesaid compounds are obtainable by mixing boron hydrocarbons of the formula $BR_3$ with acid amides of the formula $$H_2N-\overset{\overset{Y}{\|}}{C}-Z$$

wherein R, Z and Y have the above meaning, heating the mixture until hydrocarbon is split off in an amount calculated by way of the following equations, and then isolating the condensation product formed from the reaction mixture.

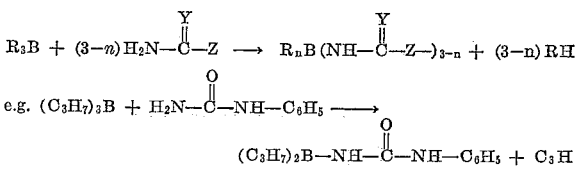

Boron hydrocarbons which are suitable for the process of the invention are e.g. trialkyl boranes such as triethyl borane, tri-n-propyl borane, tri-iso-propyl borane, tri-n-butyl borane, trio-iso-butyl borane, tri-sec.-butyl borane; the isomeric triamyl boranes, the isomeric trihexyl boranes and tri-decyl boranes; tricycloalkyl boranes such as tricyclohexyl borane and tricyclopentyl borane; triaryl-boranes such as triphenyl borane, the tri-(o, m, p)-tolyl boranes, α- and β-trinaphthyl borane and tris-(o, p, m)-chlorophenyl boranes.

As examples of acid amides which are useful in the process of the invention there are mentioned amides of mono- and dicarboxylic acids such as acetamide, propionamide, butyramide, stearamide, succinic acid diamide succinimide, benzamide, o-phthalimide, anthranilic acid amide, (o, m, p)-toluic acid amides, α- and β-naphthoic acid amides; carbamic acid amides such as urea, N-methyl urea, N, N-dimethyl urea, N, N-diphenyl urea, N-ethyl urea, N-propyl urea, N-phenyl urea, N-p-chlorophenyl urea, N-o-chlorophenyl urea and N-(o, m, p)-methylphenyl ureas; polymeric ureas, e.g. reaction products of hexamethylene diamine and 2,4-toluene diisocyanate; polymeric amides, e.g. those of hexamethylene diamide and adipic acid; thiocarbamic acid amides such as thiourea, N-methylthiourea and N-phenylthiourea; acid amides such guanidine.

The reaction can be carried out in the absence of solvents, however, it is preferable to use inert solvents boiling above the reaction temperature, i.e. hydrocarbons such as o-xylene and Mepasin. It is further possible to perform the reaction with an excess quantity of a reactant as a solvent, e.g. boron hydrocarbon.

The reaction of boron hydrocarbons and acid amides frequently starts at room temperature. In order to obtain a satisfactory reaction velocity, however, it is advantages to heat the reaction mixture to temperatures above 100° C.

The compounds produced by the herein described process are substantially insensitive to air and moisture and therefore easy to handle. Due to the contents of B—C bonds they are higher in energy than similar carbon compounds.

Alkylated and arylated boranes are known to be high-energy propellants. However, utmost care has to be taken in handling these boranes, which is handicapped by their sensitivity to oxygen. Polyamides are known to be fuels and binders for solid composite propellants (see Chem. Engng., 1958, pages 145–160). Polyamides are stable to air, however, their amount of energy is relatively low.

The new compounds according to the invention combine all the positive properties of the energy-rich alkyl-boranes as well as the strength and stability qualities of polyamides. Therefore, the new compounds can be used with advantage in the above said manner as fuels for solid composite propellants. Besides, they are valuable antioxidants for oils.

The invention is further illustrated by the following examples without being restricted thereto:

*Example 1*

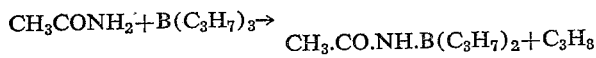

29.5 grams of acetamide and 70 grams of tri-n-propyl borane are mixed in an atmosphere of argon or oxygen-free nitrogen in a round-bottom flask equipped with a stirrer and reflux cooler The amide dissolves rapidly and the temperature increases. By heating the mixture a vivacious reaction with evolution of gas and foaming occurs at 80° C. Towards the ends of the reaction the temperature is raised at 130° C. The reaction product is distilled in vacuum, the main running consisting of the mixed amide of acetic acid and dipropyl boric acid:

distils over at 83° C./2 mm. Hg.

*Example 2*

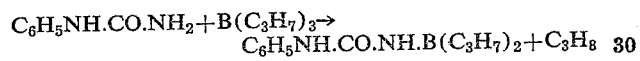

A mixture of 68 grams of phenyl urea, 250 ml. of o-xylene and 70 grams of tri-n-propyl borane is heated with the exclusion of oxygen as described in Example 1. At 88° C. evolution of gas sets in and becomes more vivacious at 105° C. The temperature is gradually elevated and finally raised until evolution of gas on the reflux cooler ceases. The solvent is then distilled off in vacuum, the cold distillation residue washed with toluene until the latter runs off completely colorless and the white crystals are dried in vacuum. The crystals are very slightly soluble or insoluble in benzene, cyclohexane, ether, toluene and petroleum ether. M.P. above 220° C.

*Example 3*

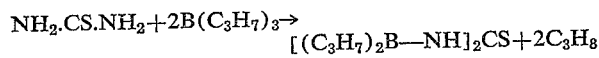

A mixture of 38 grams of thiourea, 140 grams of tri-n-propyl borane and 150 ml. of o-xylene is heated as described in Example 1. At 115° C. the reaction starts with evolution of gas and foaming. The mixture is kept at this temperature until the reaction is complete. Thereafter the xylene is distilled off at 1 mm. Hg and the residue washed with ether and petroleum ether. According to analysis the white crystals obtained correspond to the formula

*Example 4*

136 grams of 2-aminobenzoic acid amide are suspended in 1350 ml. of o-xylene, and 154 grams of tri-n-propyl borane are added dropwise at 100° C. The mixture is slowly heated up to 144° C. Propane escapes in a quantity of totally 44 l. The content of the flask is cooled to 3° C. and the crystals formed are filtered off and recrystallised from xylene with the addition of active carbon. M.P. 146° C. Yield 85% of the theoretical of purified centodihydroboro pyridmidone.

*Analysis.*—Calculated for: C, 63.8%; H, 6.96%; N, 14.9%; B, 5.57%. Found: C, 63.4%; H, 7.00%; N, 14.82%; B, 5.92%;

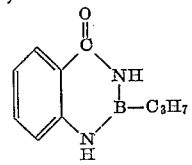

We claim:

1. Boron nitrogen compounds of the formula:

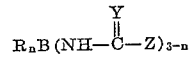

wherein R is a radical selected from the group consisting of alkyl, aryl, cycloalkyl, and alkylaryl radicals; $n$ is one one of the integers 0, 1 and 2, Y is a member of the class consisting of sulfur and oxygen, and Z represents a radical selected from the group consisting of alkyl, phenyl, naphthyl, cyclohexyl, cyclopentyl, aralkyl, amino, alkylamino, arylamino, alkylboroamido, and arylboroamido radicals.

2. A compound of the formula $(C_3H_7)_2BNHCOCH_3$.
3. A compound of the formula

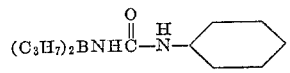

4. A compound of the formula $[(C_3H_7)_2BNH]_2CS$.
5. A compound of the formula

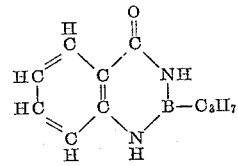

6. Process for manufacturing compounds of the formula:

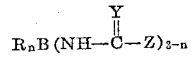

wherein R is a radical selected from the class consisting of alkyl, aryl, cycloalkyl and alkylaryl radicals; $n$ is one of the integers 0, 1 and 2; Y is a member of the class consisting of sulfur and oxygen, and Z represents a radical selected from the group consisting of alkyl, phenyl, naphthyl, cyclohexyl, cyclopentyl, aralkyl, amino, alkylamino, arylamino, alkylboroamido, and arylboroamido radicals; which process comprises contacting a boron compound of the formula $BR_3$ with a compound of the formula:

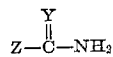

wherein R, Z, and Y have the same meaning as above, heating the mixture to a temperature sufficient to cause formation of a hydrocarbon of the formula RH, but sufficiently low that the boron compounds contained in the mixture do not decompose thermally, until $3-n$ moles of hydrocarbon are formed, and recovering the boron nitrogen compound.

7. Process according to claim 6, wherein acetamide is reacted with tri-n-propylborane.
8. Process according to claim 6, wherein N-phenylurea is reacted with tri-n-propylborane.
9. Process according to claim 6, wherein thiourea is reacted with tri-n-propylborane.
10. Process according to claim 6, wherein o-aminobenzoic amide is reacted with tri-n-propylborane.

No references cited.

UNITED STATES PATENT OFFICE
CERTIFICATE OF CORRECTION

Patent No. 3,065,267                    November 20, 1962

Konrad Lang et al.

It is hereby certified that error appears in the above numbered patent requiring correction and that the said Letters Patent should read as corrected below.

Column 1, line 64, for "Y is oxygen and Z is a phenylamino-radical" read -- Y is sulfur and Z is a dipropyl-boroamido-group --.

Signed and sealed this 28th day of May 1963.

(SEAL)
Attest:

ERNEST W. SWIDER
Attesting Officer

DAVID L. LADD
Commissioner of Patents